O. N. BRYAN.
Fish Hatching Boxes.
No. 151,080.                                     Patented May 19, 1874.
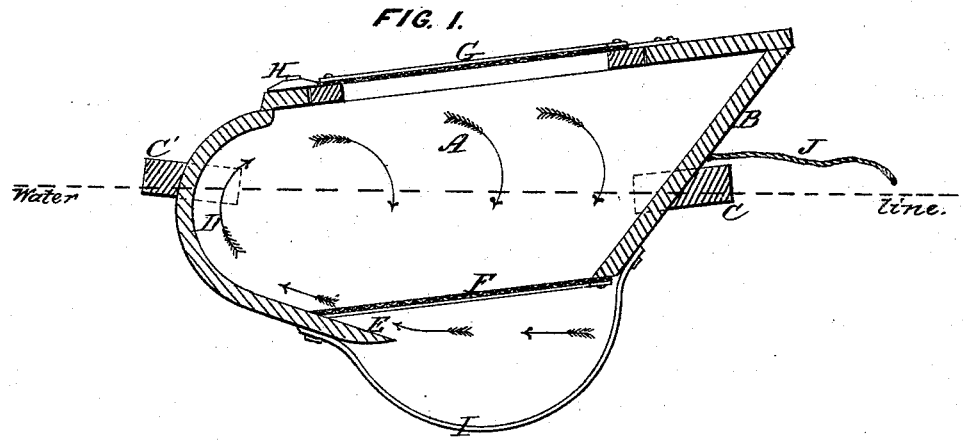
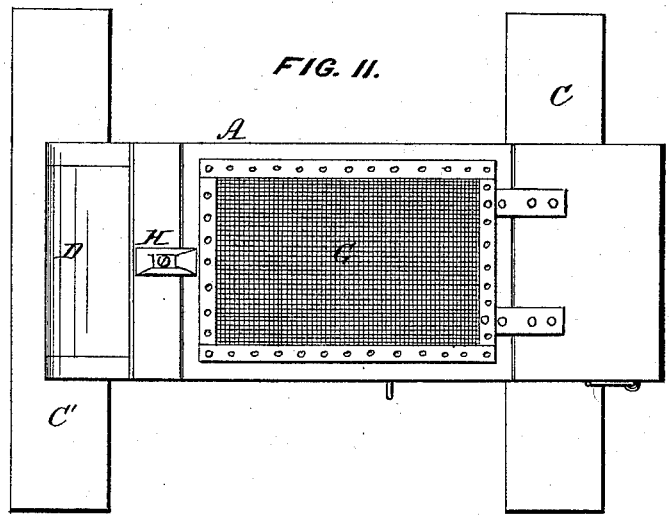
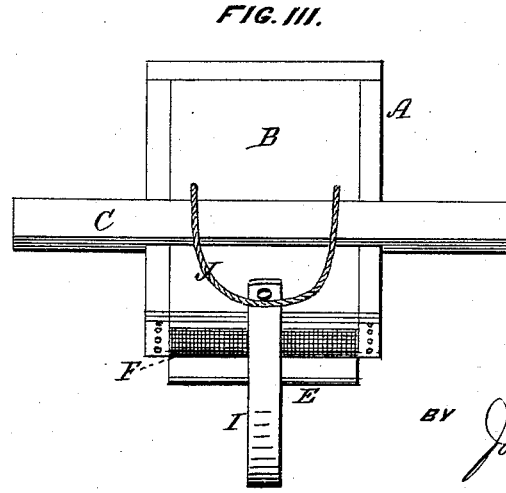
WITNESSES:
INVENTOR:
OLIVER N. BRYAN
BY Johnson & Johnson
HIS ATTY'S.

UNITED STATES PATENT OFFICE.

OLIVER N. BRYAN, OF ACCOKEEK, MARYLAND.

IMPROVEMENT IN FISH-HATCHING BOXES.

Specification forming part of Letters Patent No. 151,080, dated May 19, 1874; application filed April 8, 1874.

*To all whom it may concern:*

Be it known that I, OLIVER N. BRYAN, of Accokeek, in the county of Prince George's and State of Maryland, have invented certain new and useful Improvements in Fish-Propagators or Spawn-Boxes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to produce a spawn-hatcher which may be used not only in the shallows, but in stormy or agitated waters, and which shall safely ride in the waves, and preserve its contents always in their normal state of agitation. To this end my said invention consists of a spawn or hatching box having its riding or breasting end inclined, so as to rise and fall with the waves, and supported upon the surface of the water by floats or outriggers at right angles to the length of the said box, which also has a rounded stern, in combination with a screen-bottom and a tide-gage upon the bottom, whereby a certain and proper quantity of the flowing tide is gently but positively directed through the bottom screen, and caused to almost naturally agitate the spawn, by following the line of the rounded stern; and, in order to prevent any possibility of the upsetting of the box, it is provided upon its bottom with a sufficiently weighty balancing-keel, which tends constantly to keep the box in proper position, and to right it if overturned, the whole being constructed as will be presently described.

In the accompanying drawings, Figure 1 represents a vertical longitudinal section, Fig. 2 a top view, and Fig. 3 a front view, of a fish-spawn hatcher embracing my invention.

The box A is oblong, and has an inclined riding or breasting end, B, so that it may easily rise and fall with the beats of the waves. It is supported upon the water by floats or outriggers C C′, which are attached to each end of the box, and placed at right angles to the length thereof, which outriggers C C′ may be of any suitable length in proportion to the state of the water—longer for rough water, and shorter for smooth—the front outrigger C being placed nearer to the bottom, in order to elevate the breasting end; and the rear outrigger C′ is raised nearer the top, to give the proper inclination to the box. In any condition of water, however, the breasting end B should be somewhat elevated by the float C. The rear end D of the box is rounded, to act, in combination with a tide-gage, E, to direct the flowing tide with a circular motion within the box. This tide-gage extends, in a line produced from the bottom of the rounded end D, a short distance underneath the bottom of the box, and across it, to receive the necessary quantity of the flowing tide, and directs it upward through the screen F, forming the bottom of the box, in the line of the curved end D, so that a gentle agitation of the spawn is at all times effected by the circular motion of the water. The top of the box is also supplied with a hinged gauze cover, G, which may be fastened by a button, H, if desired, and is kept open generally, but in the night, and when there is danger of the water being agitated by storms and steamboats, it is closed; and, no matter how rough the water may be, the spawn receives no injury by being scattered or washed out. The box is provided on its bottom with a bowed balancing-keel, I, which is sufficiently weighty to right the box if, by any accident, it should be overturned. But the floats or outriggers, however, serve to prevent any lateral overturning of the box; but these, in combination with the balancing-keel, guard very effectually against such accidents.

The boxes may be anchored, if desired; but I prefer to attach them by the bow-cord J, either one box to a stake by a loop, or several connected boxes, in line, to one stake. This arrangement allows them to float freely without entanglement with their fastenings.

I claim—

1. In a fish-propagator or spawn-box, the front inclined breasting and riding end B, as and for the purpose described.

2. In a fish-propagator or spawn-box, the end floats or outriggers C C′, arranged at right angles to the length of the box, and at different heights from the bottom and from each other, as and for the purpose described.

3. In a spawn-box, such as above claimed, the balancing-keel I, as and for the purpose described.

4. The combination, in such spawn-box, of the rounded stern end D with tide-gage E and screen-bottom F, for the purpose of properly directing the water to agitate the spawn, as described.

In testimony that I claim the foregoing as my own I affix my signature in presence of two witnesses.

OLIVER N. BRYAN.

Witnesses:
  A. E. H. JOHNSON,
  J. W. HAMILTON JOHNSON.